United States Patent
Gerstenhaber et al.

(10) Patent No.: US 11,105,046 B2
(45) Date of Patent: Aug. 31, 2021

(54) COMPOSITION AND METHOD OF PRODUCING A CREPING PAPER AND THE CREPING PAPER THEREOF

(71) Applicant: SOLENIS TECHNOLOGIES, L.P., Wilmington, DE (US)

(72) Inventors: David A. Gerstenhaber, Landenberg, PA (US); Timothy F. Patterson, Wilmington, DE (US); Philip Michael Viger, Toronto (CA); Samuel Jeremy Mitton, Moncton (CA)

(73) Assignee: Solenis Technologies, L.P., Wilmington, DE (US)

( * ) Notice: Subject to any disclaimer, the term of this patent is extended or adjusted under 35 U.S.C. 154(b) by 261 days.

(21) Appl. No.: 15/926,947

(22) Filed: Mar. 20, 2018

(65) Prior Publication Data
US 2018/0274175 A1 Sep. 27, 2018

Related U.S. Application Data

(60) Provisional application No. 62/474,184, filed on Mar. 21, 2017.

(51) Int. Cl.
*D21H 21/14* (2006.01)
*D21H 21/24* (2006.01)
(Continued)

(52) U.S. Cl.
CPC ........... *D21H 21/146* (2013.01); *C08G 77/46* (2013.01); *C08L 83/04* (2013.01); *C08L 83/06* (2013.01); *C08L 83/10* (2013.01); *C08L 83/12* (2013.01); *D21H 21/24* (2013.01); *D21H 25/005* (2013.01); *D21H 27/40* (2013.01); *C08G 77/14* (2013.01)

(58) Field of Classification Search
CPC .......... C08L 83/10; C08G 77/14; D21H 17/56; D21H 21/146; D21H 21/24
See application file for complete search history.

(56) References Cited

U.S. PATENT DOCUMENTS 5,059,282 A  10/1991 Ampulski et al.
5,164,046 A * 11/1992 Ampulski .............. D21H 17/59
                                                    162/111
(Continued)

FOREIGN PATENT DOCUMENTS

WO     98/29605 A    7/1998
WO     2009134364 A2  11/2009
(Continued)

OTHER PUBLICATIONS

USPTO, International Search Report and Written Opinion issued in International Application No. PCT/US2018/023421, dated May 8, 2018.

*Primary Examiner* — Michael A Salvitti
(74) *Attorney, Agent, or Firm* — Lorenz & Kopf, LLP

(57) ABSTRACT

The present disclosure provides for a composition and method of producing a creped paper and the creped paper products made using this method. The method includes treating the surface of a wet fibrous web and/or surface of a Yankee drum dryer or cylinder with compositions containing a combination of a polyaminosilicone/polyaminosilicone block copolymer/surfactant and optionally one or more creping aids.

9 Claims, 2 Drawing Sheets

Effect of Composition of Creping Force

(51) Int. Cl.
  *C08L 83/04*  (2006.01)
  *C08L 83/10*  (2006.01)
  *D21H 27/40*  (2006.01)
  *C08L 83/06*  (2006.01)
  *C08L 83/12*  (2006.01)
  *C08G 77/46*  (2006.01)
  *D21H 25/00*  (2006.01)
  *C08G 77/14*  (2006.01)

(56) References Cited

U.S. PATENT DOCUMENTS

| | | | | |
|---|---|---|---|---|
| 5,246,546 | A * | 9/1993 | Ampulski | D21H 17/00 162/112 |
| 5,374,334 | A | 12/1994 | Sommese et al. | |
| 5,385,643 | A | 1/1995 | Ampulski | |
| 5,538,595 | A | 7/1996 | Trokhan et al. | |
| 5,683,811 | A * | 11/1997 | Hernandez | D01D 5/24 428/221 |
| 5,807,956 | A * | 9/1998 | Czech | A61K 8/898 528/28 |
| 5,908,707 | A * | 6/1999 | Cabell | C11D 17/049 424/405 |
| 5,981,681 | A * | 11/1999 | Czech | A61K 8/898 528/27 |
| 6,511,580 | B1 * | 1/2003 | Liu | C08G 77/388 162/109 |
| 6,576,087 | B1 * | 6/2003 | Liu | C08G 77/46 162/109 |
| 7,396,593 | B2 * | 7/2008 | Liu | B05C 5/027 428/532 |
| 7,744,722 | B1 | 6/2010 | Tucker et al. | |
| 8,147,649 | B1 | 4/2012 | Tucker et al. | |
| 8,158,572 | B2 * | 4/2012 | Schubert | C11D 3/001 510/466 |
| 8,444,812 | B2 | 5/2013 | Grigoriev et al. | |
| 8,608,904 | B1 | 12/2013 | Tucker et al. | |
| 9,243,367 | B2 | 1/2016 | Rekoske et al. | |
| 2003/0188841 | A1 * | 10/2003 | Buder | A61K 8/731 162/179 |
| 2004/0163782 | A1 * | 8/2004 | Hernandez-Munoa | D21H 21/22 162/91 |
| 2008/0271867 | A1 | 11/2008 | Donner | |
| 2009/0197081 | A1 * | 8/2009 | Herzig | C08G 77/38 428/365 |
| 2010/0089540 | A1 | 4/2010 | Buder et al. | |
| 2011/0162811 | A1 * | 7/2011 | Furman | D21H 19/30 162/111 |
| 2012/0255693 | A1 * | 10/2012 | Druecke | D21H 21/146 162/111 |
| 2012/0255694 | A1 * | 10/2012 | Druecke | D21H 21/146 162/111 |
| 2018/0274175 | A1 * | 9/2018 | Gerstenhaber | C08L 83/04 |

FOREIGN PATENT DOCUMENTS

| | | | | |
|---|---|---|---|---|
| WO | WO-2009134364 A2 * | 11/2009 | | A61K 8/90 |
| WO | 2013/074912 A | 5/2013 | | |

\* cited by examiner

COMPOSITION AND METHOD OF PRODUCING A CREPING PAPER AND THE CREPING PAPER THEREOF

CROSS-REFERENCE TO RELATED APPLICATION

This application claims the benefit of U.S. Provisional Patent Application No. 62/474,184, filed Mar. 21, 2017, the entire contents of which are hereby incorporated by reference.

BACKGROUND

The present disclosure provides for a composition and method of producing a creped paper and the creped paper products made using the method. Such products include, but are not limited to bath tissue, facial tissue and towel. The method also relates to the use of a polyaminosilicone/polysilicone block copolymer/surfactant composition optionally, in combination with creping aids, such as, release or modifier agents, additional surfactants, adhesives and the like, for producing an improved formulation used in the production of creped paper. A polyaminosilicone/polysilicone block copolymer/surfactant composition was developed that could be applied to the surface of a wet fibrous web prior to a Yankee dryer and/or directly onto the surface of a Yankee drum dryer or cylinder to improve crepe quality and softness of the product produced.

A creped paper, such as tissue or towel, is produced by pressing a wet fibrous web against the surface of a heated cylindrical dryer, called a Yankee dryer or Yankee cylinder, which terms will be used interchangeably, so that the wet fibrous web adheres thereto, followed by drying, and then stripping the dry fiber web from the Yankee dryer using a doctor blade or a crepe blade, which terms will be used interchangeably.

In modern creping operations, it is typical to use compositions comprising adhesives, release agents, modifiers, surfactants and plasticizers to aid creping operations on a high-speed creping machine. The compositions when applied to the surface of a Yankee cylinder or dryer, ensures the wet fibrous web is transferred smoothly to the hot Yankee dryer. The composition, as will be addressed in a following paragraph, is also critical to the creping process. Good adhesion is necessary for the wet paper web to transfer to the Yankee dryer surface. Good adhesion also helps faster drying of the wet paper or fiber web by the steam heated Yankee dryer and hot air from an overhead hood. A proper surface application, uniform and of sufficient magnitude, provides adequate adhesion for easy transfer of the wet paper web onto the Yankee cylinder surface.

Softness, like strength and absorbency, plays a key role in consumer preference. Softness relates both to the product bulk and surface characteristics. Softness is the tactile sensation perceived by a user when they touch and hold the paper product and is often called "handfeel". Absorbency relates to the ability to both rapidly take up water and hold the water in the structure of the tissue or towel.

Creping processes are well known in the art. The fibrous web is adhered to a dryer, for example, a Yankee dryer, and removed from the dryer using a flexible creping blade. The terms "creping blade", "crepe blade", and "doctor blade" are used interchangeably herein. The creping blade can be made of metal, ceramic, or other materials known in the art. The degree to which the web is adhered to the dryer is a factor in determining how effective the creping will be, and thus, the bulk, stretch, and softness of the creped web. Creping increases the softness of the paper by forming the creped structure, breaking a significant number of interfiber bonds, and exposing fiber ends to the surface of the sheet. The creped structure results in the paper being mechanically foreshortened in the machine direction which enhances bulk and stretch, as well as softness.

In order to form a high-quality crepe paper, the adhesion and stripability of the wet fiber web and crepe paper to and from the heated cylindrical dryer are important, and the degrees thereof greatly influence the crepe configuration. The degree of stripability is controlled by both the properties of the sheet and the composition of the material that is used to adhere the wet sheet to the Yankee.

Once the wet fibrous web on the Yankee cylinder surface is dried, the dried fiber web or crepe paper is "creped off" from the Yankee cylinder surface using a doctor blade. The adhesion should be enough to generate a good crepe structure that will provide the desired "handfeel" properties to the final paper product. However, the adhesion should not be so much that it will hinder the paper web from being "scraped off" the Yankee cylinder by the doctor blade. The current composition provides for both features.

Creping aids or formulations are applied to a creping dryer surface to facilitate the creping process. These formulations can comprise creping adhesives, creping modifiers, release agents, surfactants and other creping additives, which can be used alone or in combinations thereof. The adhesion level of the web to the dryer surface is important, since it relates to the controllability of the web from the creping blade to the reel on which the paper is wound. Paper webs not sufficiently adhered to a creping dryer surface are difficult to control and can cause wrinkles and weaving of the web in the parent roll. When a web weaves at the reel, the parent roll edges are uneven. Poorly creped webs not only affect the reliability of the creping operation, but can also cause sheet breaks, as well as, difficulties in converting base sheet into finished product rolls of towel or tissue. The level of adhesion of a web to a creping dryer surface is also important because it relates to the transfer of heat from the surface of the dryer to the web and ultimately affects the drying rate. Therefore, higher levels of adhesion allow for a web to dry faster, thus allowing the paper machine to operate at higher speeds. It is important that the creping aids have the proper softness/flexibility to allow sheet adhesion yet allow a doctor blade to maintain a clean creping dryer surface. For example, if a creping adhesive becomes too hard, incomplete removal of adhesive from the creping surface can occur and portions of the web may remain adhered to the creping dryer surface. When portions of the web remain adhered to the creping dryer, defects often result in the web, ultimately leading to poor quality products and breaks in the web in the open draw between the creping doctor and reel. Altering the softness/flexibility also alters the properties of the creped sheet. The creping process involves a "collision" between the crepe blade and the sheet. The result of the collision is fracture at or near the interface between the sheet and the formulation applied to the Yankee. How that fracture occurs is to a large extent controlled by how the energy required to produce the fracture is dissipated. The mechanical properties of both the sheet and the Yankee play a significant role in that process.

Mills typically use creping aids, such as, adhesives, surfactants, modifiers and release agents in combination. These are referred to as creping formulation packages, which helps control adhesion and release of the paper web to and from the surface of the Yankee dryer or cylinder. In addition, the use of one or more of the creping aids is used to control the mechanical properties of the composition used in coating the surface of the Yankee dryer.

Mills have found using three or more creping aid components in a formulation makes the Yankee creping operation overly complicated; machine operators are unable to reliably optimize the relative amounts of the components. Therefore, tissue and towel manufacturers typically try to use as few agents as possible to control adhesion and mechanical properties when the composition is applied to the surface of the Yankee dryer or fiber web.

U.S. Pat. No. 5,807,956 (Czech), discloses non-hydrolyzable, block, $(AB)_nA$ type, copolymers comprising alternating units of polyaminosilicones and amino-polyalkyleneoxides and provides a method for the preparation of these copolymers. The reference teaches the use of these copolymers as hydrophilic textile softeners, which improve tactile properties of the textiles substrates treated with commercial soil release finishes.

US 2010/0089540A1 (Buder et al.), discloses a composition for cellulosic fibers containing amino silicone to impart improved handfeel. The composition is included in a lotion applied to tissue paper and may include a hydrophilic softener. The composition is applied to the tissue paper substrate.

U.S. Pat. No. 8,444,812B2 (Grigoriev et al.), discloses an adhesive composition comprising a polyaminoamide epihalohydrin (PAE) resin acidified with at least one multifunctional acid wherein a first functional group is selected from carboxyl and sulfonyl and a second functional group is selected from carboxyl, sulfonyl, hydroxyl, lactone, phenol, amine, or heterocycle. The adhesive composition is formulated with functional additives including quaternary salts to improve softness of a tissue paper.

U.S. Pat. No. 5,374,334 (Sommese et al.), discloses adhesive compositions which show good utility when used in the tissue manufacturing process as Yankee dryer coating agents. The adhesive compositions include a polymer containing vinylamine moieties.

US 2008/0271867A1 (Donner), provides for a tissue paper product having at least one ply wherein only one outer surface of the tissue paper product has a chemical softening agent applied and substantially affixed thereto including a combination of an organo-silicone with a suitable quaternary ammonium salt.

U.S. Pat. No. 7,744,722 (Tucker et al) teaches about application of creping modifier comprising polyethylene to the surface of creping cylinder. The creping modifier further comprises mineral oil, cationic and nonionic surfactants. U.S. Pat. Nos. 8,608,904 and 8,147,649 by the same authors expand the teaching onto applications including oxidized polyethylene in combination with mineral oil and surfactants.

U.S. Pat. No. 9,243,367 B2 (Rekoske et al.), is directed to creped tissue webs, and products produced therefrom. In particular, the tissue paper will have TS7 values less than about 8.0 and a geometric mean tensile ("GMT") greater than about 300 g/3" for single-ply tissue webs and greater than about 500 g/3" for multi-ply tissue products.

U.S. Pat. Nos. 5,509,282, 5,246,546 and 5,385,643, issued to the same inventor, disclose the use of polysiloxanes to impart softness of tissue, such as, the silky, flannel softness perception. U.S. Pat. No. 5,059,282 discloses that the polysiloxane can be sprayed or printed onto a tissue during the papermaking process. U.S. Pat. Nos. 5,246,546 and 5,385,643 teach the use of polysiloxanes and methods for applying polysiloxane emulsions to a dry creped tissue sheet. Both patents teach that applying addition of the polysiloxane to the tissue web before the web is dried and creped, in accordance with the process disclosed in U.S. Pat. No. 5,509,282, can result in interference with the coating on the Yankee dryer and also cause skip crepe and a loss in sheet control. Importantly, these problems are eliminated by the process of the present disclosure wherein the polysiloxane is added to the tissue sheet after the sheet leaves the Yankee dryer.

A through-air-dried web tends to have poorer adhesion to a creping dryer surface than a conventionally wet pressed web. There are several reasons for this phenomenon. First, through-air-dried webs contact the surface of a creping dryer at lower contact levels since the web is transferred to the surface of the creping dryer with a limited-knuckle-area fabric, while a conventionally wet-pressed web is pressed more uniformly with a felt against the dryer surface. Second, through-air-dried webs are transferred to a Yankee dryer surface at higher dryness levels, while conventionally wet-pressed webs are transferred at lower dryness levels. The lower dryness level facilitates more intimate contact of the web with the dryer surface and, hence, better adhesion.

Other issues that occur in a creping process is when a creping adhesive becomes too hard, incomplete removal of adhesive from the creping surface can occur and portions of the web may remain adhered to the creping dryer surface. When portions of the web remain adhered to the creping dryer, defects often result in the web, ultimately leading to poor quality products and breaks in the web in the open draw between the creping doctor and reel.

Excessive build-up of creping adhesive on the creping dryer surface is another problem associated with the use of creping aids, for example, producing streaky dryers. The streaks on the dryer impact the profile of adhesion in the cross-direction (CD), or width direction, of a paper machine, often resulting in reels with bumps or wrinkles. The usual remedy is to change creping blades; however, changing the blades leads to downtime of the paper machine, and creping blades are costly. Alternatively, coating streaks can be controlled through the use of a cleaning blade, which is positioned after the creping blade on a creping dryer. The cleaning blade is frequently changed to control streaks and excessive adhesive build-up.

The present method provides for a composition and method for the improvement of creping operations in the manufacturing of creped products such as tissue and towel. It also provides a composition that not only provides for improved adhesion properties, but also gives enhanced softness compared with traditional creping formulation packages.

SUMMARY

Provided is a composition that yields enhanced creping of a fibrous web in the manufacture of creping paper and products. The current composition comprises a polyaminosilicone/polyaminosilicone block copolymer/surfactant composition or a polysiloxane/polyaminosilicone block copolymer/surfactant composition, wherein the polyaminosilicone or polysiloxane is a linear or branched polyaminosilicone or a linear or branched polysiloxane. The polyaminosilicone block copolymer is a non-hydrolyzable, block, (AB) or $(AB)_nA$ type copolymer comprising alternating units of polysiloxane and amino-polyalkylene oxide. The surfactant of the present composition is selected from the group of alkoxylated alcohols. In addition, the polyaminosilicone/polyaminosilicone block copolymer/surfactant composition or polysiloxane/polyaminosilicone block copolymer/surfactant composition can be combined with creping aids such as, release agents, modifiers, additional surfactants, adhesive aids and other creping additives. In some aspects, the polyaminosilicone/polyaminosilicone block copolymer/surfactant composition or polysiloxane/polyaminosilicone block copolymer/surfactant composition is used alone or in combination with traditional or typical creping aid formulations that include one or more of release agents, modifiers, additional surfactants, adhesive aids and other creping additives.

Also, provided is a method for producing an improved crepe product having enhanced softness. The method includes the use of a polyaminosilicone/polyaminosilicone block copolymer/surfactant composition or polysiloxane/polyaminosilicone block copolymer/surfactant composition, that is used alone or in combination with traditional or typical creping aid formulations that include one or more of release agents, modifiers, surfactants, adhesive aids and other creping additives applied directly to a Yankee dryer or applied to the wet fibrous web prior to the Yankee dryer.

The composition and method provide the proper level of adhesion and the optimum mechanical properties of the composition applied to the surface of a Yankee dryer and provides for further improvement of efficiency and effectiveness of the creping process. The present formation can be used alone or as a package that optionally includes one or more of release agents, modifiers, additional surfactants, adhesive aids, plasticizers and other creping additives. The present creping aid system provides for an improved creping process resulting in an improved, more uniform crepe paper product.

DETAILED DESCRIPTION

Figure 1:
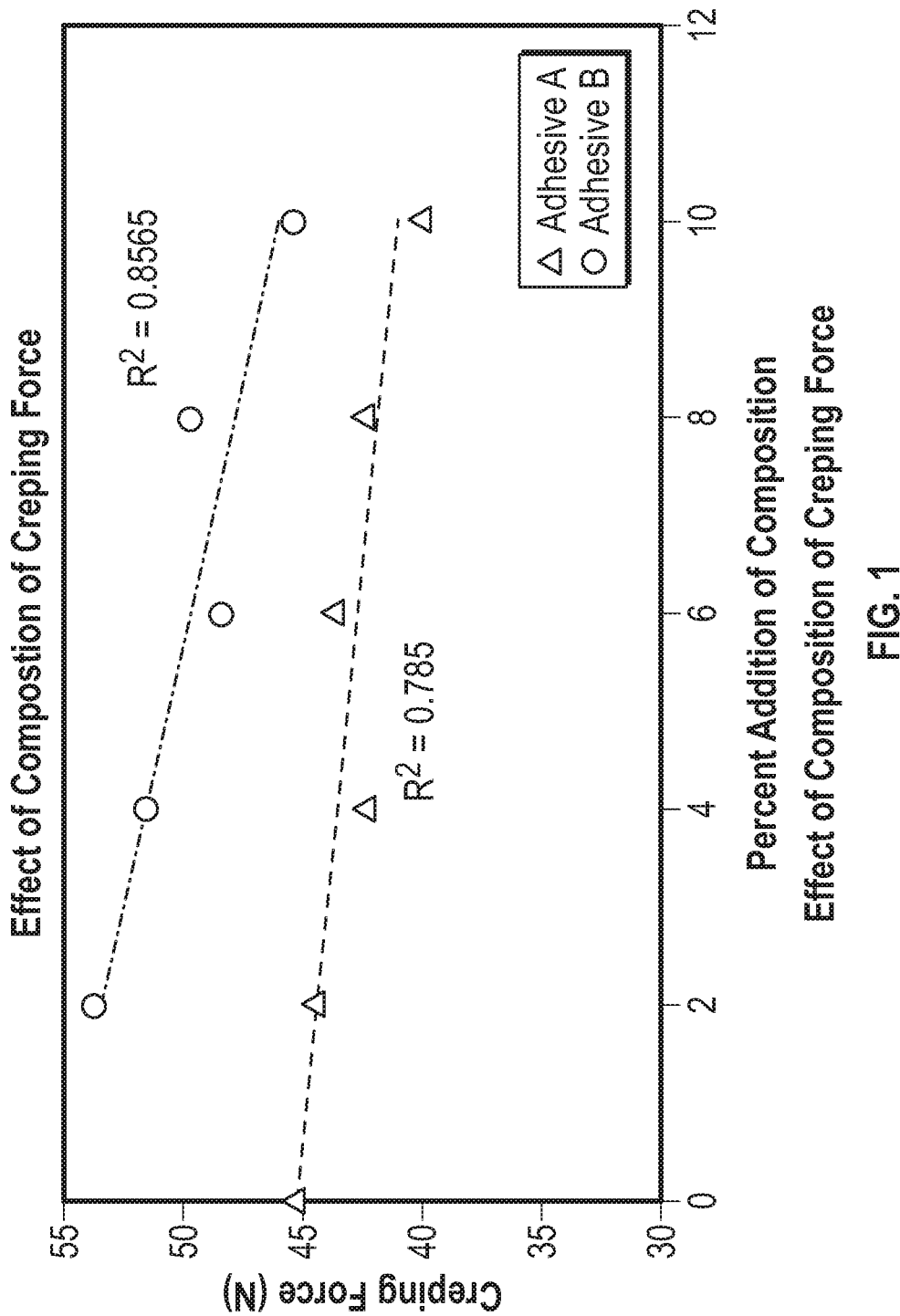
FIG. 1, shows the effect of the current composition on creping force.

The present disclosure relates to a composition comprises a polyaminosilicone/polyaminosilicone block copolymer/surfactant or a polysiloxane/polyaminosilicone block copolymer/surfactant. The polyaminosilicone/polysilicone block copolymer composition or polysiloxane/polyaminosilicone block copolymer/surfactant composition is applied to the surface of a wet fiber web and/or a Yankee drum dryer or cylinder to modify the creping process and as a result produce an improved creped paper product having enhanced softness and "handfeel".

In some aspects, the polyaminosilicone/polysilicone block copolymer composition or polysiloxane/polyaminosilicone block copolymer/surfactant composition, optionally comprises one or more creping aids including additional surfactants, adhesives, release agents, modifier agents and plasticizers. The current compositions are applied to the wet crepe fiber web or Yankee dryer prior to, simultaneously with, or subsequent to the one or more creping aids. The current compositions can also be combined or formulated with the one or more creping aids prior to application to the wet fibrous web or Yankee dryer.

In some aspects, the polyaminosilicone/polysilicone block copolymer/surfactant composition comprises from about 1% to about 98% of the polyaminosilicone or polysiloxane, from about 1% to about 98% of the polyaminosilicone block copolymer and from about 1% to about 98% surfactant. The composition can comprise from about 20% to about 80% of the polyaminosilicone or polysiloxane, from about 1% to about 40% of the polyaminosilicone block copolymer and from about 1% to about 40% surfactant and the composition can comprise from about 50% to about 80% of the polyaminosilicone or polysiloxane, from about 1% to about 20% of the polyaminosilicone block copolymer and from about 1% to about 20% surfactant.

In some aspects the polyaminosilicone/polysilicone block copolymer/surfactant in the paragraph above, is a component in a formulation that optionally comprises one or more creping aids. The creping aids can include surfactants, adhesives, release agents, modifier agents, plasticizers and the like. The polyaminosilicone/polyaminosilicone block copolymer/surfactant can be up to 25% by wt. of the total formulation, can be up to 40% by wt. of the total formulation and may be up to 60% by wt. of the total formulation with the remainder of the formulation made up of surfactants, adhesives, release agents, modifier agents, plasticizers and the like.

In still other aspects, a method is provided for enhancing the creping of a fibrous web wherein an aqueous formulation is applied directly onto a Yankee dryer or applied to a wet fibrous web prior to the Yankee dryer. The formulation comprises from about 1% to about 98% of the polyaminosilicone or polysiloxane, from about 1% to about 98% of the polyaminosilicone block copolymer and from about 1% to about 98% surfactant. The composition can comprise from about 20% to about 80% of the polyaminosilicone or polysiloxane, from about 1% to about 40% of the polyaminosilicone block copolymer and from about 1% to about 40% surfactant and the composition can comprise from about 50% to about 80% of the polyaminosilicone or polysiloxane, from about 1% to about 20% of the polyaminosilicone block copolymer and from about 1% to about 20% surfactant.

In some aspects, the polyaminosilicone or polysiloxane of the polyaminosilicone/polysilicone block copolymer/surfactant composition is linear or branched. The polyaminosilicone block copolymer is a non-hydrolyzable, block, (AB) or $(AB)_n$ A type copolymer comprising alternating units of polysiloxane and amino-polyalkylene oxide. The alternating units of polysiloxane can be, for example, $[X(C_aH_{2a}O)_bR^2[SiO(R^1)_2]_cSi(R^1)_2R^2(OC_aH_{2a})_bX]$ and polyalkyleneoxides $[YO(C_aH_{2a}O)_dY]$, wherein $R^1$ is a $C_1$ to $C_4$ alkyl, $R^2$ is a divalent organic moiety, X and Y are divalent organic groups selected from a secondary or tertiary amine and a ring opened epoxide, such that when X is a ring opened epoxide, Y is an amine and vice versa, a is 2 to 4, or 2 to 3, each occurrence of b is 0 to 100, d is 0 to 100, (b+d) is 1 to 100 or 10 to 50, and c is 1 to 500 or 10 to 100. Other polyaminosilicone block copolymers of the present composition can be found in U.S. Pat. No. 5,807,956, incorporated herein by reference in its entirety. The surfactant(s) are selected from the group of alkoxylated alcohols. In other aspects, the surfactant is selected from the group of linear alcohol ethoxylated, branched alcohol ethoxylated, polyethylene glycol mono or diester fatty acid, polyethylene glycol alkyl ether and combinations thereof. In yet other aspects the surfactant is tridecyl alcohol alkoxylate (TDA).

In some aspects, the surfactant is a linear alkoxylated alcohol having from about 6 to about 20 carbon atoms, can have from about 10 to about 16 carbon atoms; and have from about 1 to about 100 ethylene oxide units, can have from about 1 to about 50 ethylene oxide units, can have from about 5 to about 50 ethylene oxide units, can have from about 1 to about 20 ethylene oxide units and may have from about 30 to about 50 ethylene oxide units.

In yet other aspects, the polyamino block copolymer is alternating units of polysiloxanes and polyalkyleneoxides.

In yet other aspects of the formulation, the polyaminosilicone has a formula of $[X(C_aH_{2a}O)_bR^2[SiO(R^1)_2]_cSi(R^1)_2R^2(OC_aH_{2a})_bX]$ and polyaminosilicone block copolymer has a formula of $[YO(C_aH_{2a}O)_dY]$, wherein $R^1$ is a $C_1$ to $C_4$ alkyl, $R^2$ is a divalent organic moiety, X and Y are divalent organic groups selected from a secondary or tertiary amine and a ring opened epoxide, such that when X is a ring opened epoxide, Y is an amine and vice versa, a is 2 to 4 or 2 to 3, each occurrence of b is 0 to 100, d is 0 to 100, (b+d) is 1 to 100 or 10 to 50, and c is 1 to 500 or 10 to 100.

In some aspects of the composition, the surfactant is selected from the group of linear alcohol alkoxylated, branched alcohol alkoxylated, polyethylene glycol mono or diester fatty acid, polyethylene glycol alkyl ether and combinations thereof. In some aspects the surfactant is a tridecyl alcohol alkoxylate (TDA). Application of the polyamino/polyamino block copolymer/surfactant composition alone or in combination with a creping aid formulation to the surface of the wet fibrous web and/or Yankee cylinder is done using typical techniques in the industry such as spray and puddle methods. The polyaminosilicone/polyaminosilicone block copolymer/surfactant composition and optionally, one or more creping aids including additional surfactants, adhesives, release agents and modifier agents, plasticizers and the like, is applied to the surface of the wet fiber web and/or Yankee cylinder separately, in any order, simultaneously or together as a formulation.

As used herein, wet fiber web and wet fibrous web are used interchangeably and used to denote the web that is formed prior to the Yankee dryer.

In some aspects the polyaminosilicone/polyaminosilicone block copolymer/surfactant composition, is incorporated into a creping aid formulation that can include additional surfactants, release agents, modifier agents, adhesives and plasticizers. These additional additives are selected from creping aids typically used in the industry and includes hydrophobic materials, nonionic surfactants, anionic surfactants, and mixtures of thereof.

In some aspects, the creping aid formulation contains hydrophobic material selected from the group of mineral oil, vegetable oil, fatty acid esters, natural or synthetically derived hydrocarbon, natural or synthetically derived wax, Carnauba wax, hydrolyzed AKD, polyethylene homopolymers, polypropylene homopolymers, ethylene-acrylic acid copolymers, ethylene maleic anhydride copolymers, propylene maleic anhydride copolymers, polyethylene homo polymers, oxidized polypropylene homopolymers, oxidized polyethylene homopolymers and combinations thereof. In some aspects, the release agent and modifier agent is a fatty acid tri-ester, synthetically derived hydrocarbon, anionic surfactants and/or linear or branched alkoxylated alcohol.

In yet other aspect, the creping aid formulation contains a nonionic surfactant selected from the group of linear alcohol ethoxylated, branched alcohol ethoxylated, polyethylene glycol mono or diester fatty acid, polyethylene glycol alkyl ether and combinations thereof.

In still other aspects, the creping aid formulation contains an anionic surfactant selected from the group of sodium dioctylsulfosuccinate, sodium dodecylbenzenesulfonate, sodium lauryl sulfate and combinations thereof.

In some aspects, the adhesive of a creping aid formulation is selected from the group of a thermosetting resin, a non-thermosetting resin, a polyamide resin, a polyaminoamide resin, polyvinylamine, a glyoxalated polyacrylamide resin, a film-forming semi-crystalline polymer, hemicellulose, carboxymethyl cellulose, polyvinyl alcohol, an inorganic cross-linking agent and combinations thereof.

In another aspect, the polyaminosilicone/polyaminosilicone block copolymer/surfactant and one or more creping aids are mixed together before the chemicals are applied to the surface of the wet fiber web and/or the Yankee dryer.

In another aspect, polyaminosilicone/polyaminosilicone block copolymer/surfactant and one or more creping aids are applied separately to the surface of the wet fiber web and/or the Yankee dryer.

In yet another aspect, polyaminosilicone/polyaminosilicone block copolymer/surfactant and one or more creping aids is first applied to the fibrous web, wherein the composition is transferred to the surface of the Yankee dryer on pressing the fibrous web against the surface of the Yankee dryer.

EXAMPLES

Figure 2:
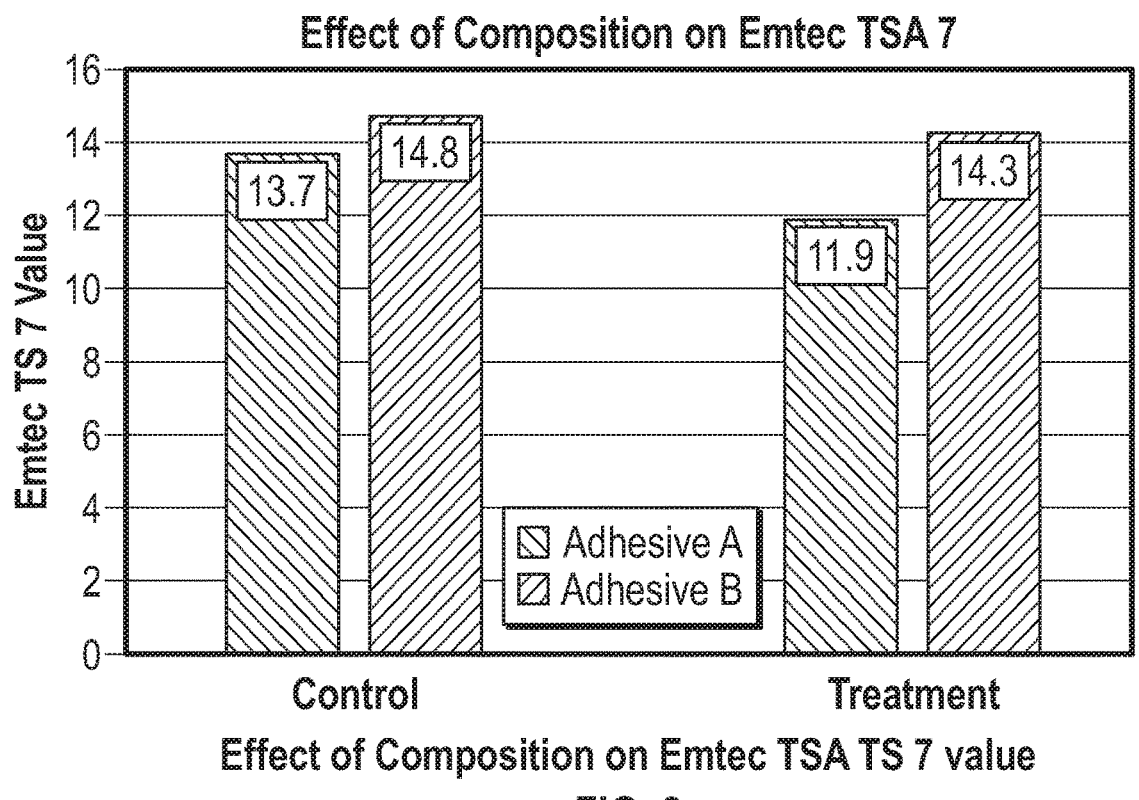
FIG. 2, shows the effect of the current composition on Emtec TSA TS 7 value.
Figure 3:
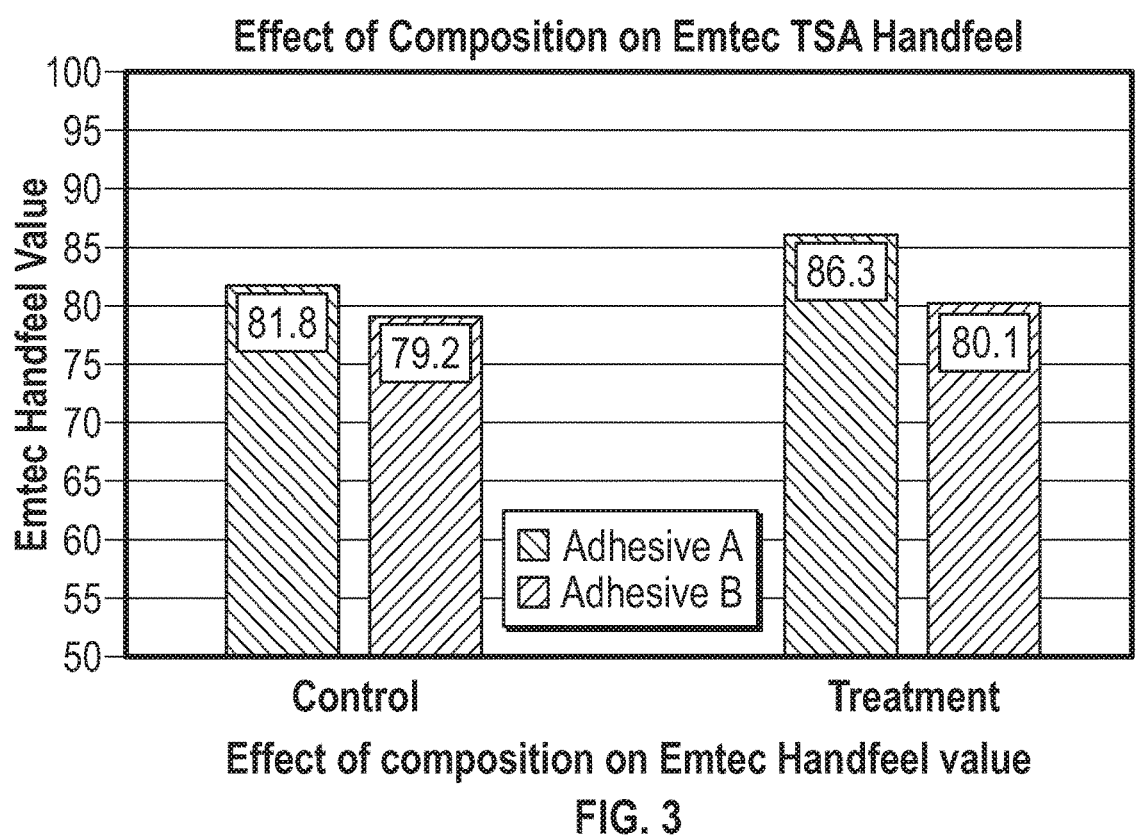
FIG. 3, shows the effect of the current composition on Emtec Handfeel value.

A number of experiments were conducted using a simulator to crepe tissue sheets. This simulator is described in "Predicting the Performance of Creping Adhesives", Proceeding of TAPPI PaperCon 2010, Atlanta, Ga. May 2010. The apparatus used simulates the creping process using a small Yankee cylinder that is heated to temperatures typically used in tissue making and performs the creping process while the Yankee is rotating at speeds typically used in tissue making. FIGS. 1, 2, and 3 show result of testing using one version of the proposed composition. In this set of experiments two different formulations were applied to the Yankee to adhere the sheet to the Yankee. Each formulation consisted of a creping adhesive, a release agent and the composition being tested. The creping adhesive and the release agent were commercial products used in the manufacture of tissue and towel. In both cases the same version of the composition was tested. The first formulation is referred to as Adhesive A, was a 2% solution in water and consisted of 70% Crepetrol® 9730 (Solenis LLC, Wilmington, Del.) and 30% Rezosol®6156 (Solenis LLC, Wilmington, Del.). The second formulation is referred to as Adhesive B, was a 2% solution in water and consisted of 70% Crepetrol®9750 (Solenis LLC, Wilmington, Del.) and 30% Rezosol®4119 (Solenis LLC, Wilmington, Del.).

The additive was put in the adhesive at 3% by solids for both adhesives, so that the final solution (adhesive+additive) was a 2.06% solution in water. The additive was a mixture containing 25% aminosilicone polymer (Xsoftsil®401, Shiwuan Chemical, Ltd.); 5% aminosilicone block co-polymer (Xsoftsil®B2050, Shiwuan Chemical, Ltd.); 4% tridecyl alcohol alkoxylate (8-mole EO adduct) (Iconol®TDA, BASF Corporation); 33% glycerol; and 4% polyethylene glycol (PEG).

The inventive composition consists of the aminosilicone polymer, the aminosilicone block copolymer and tridecyl alcohol alkoxylate. The polyethylene glycol is included to aid in mixing the components. The glycerol is a humectant that holds water, it is used regularly as an additive to creping adhesive formulations, but is not critical to the disclosure.

The additive used above is considered a mixture of glycerol and PEG with the "composition" of interest, in which the "composition" was 73% aminosilicone polymer (Xsoftsil® 401, Shiwuan Chemical, Ltd.); 15% aminosilicone block co-polymer (Xsoftsil® B2050, Shiwuan Chemical, Ltd.); and 12% tridecyl alcohol alkoxylate (8-mole EO adduct) (Iconol®TDA—BASF Corporation).

Possible other formulations would include all three components with amounts ranging from 1% to 98% of the total composition.

FIG. 1, is a graph of creping force versus the percentage of the proposed composition that was used in the creping aid formulation that was applied to the Yankee cylinder to adhere the sheet to the Yankee cylinder. Both Adhesive A and Adhesive B were used in a 2.0% solution, i.e., the solution was 2.0% solids, adhesive and release agents, and 98.0% water. The polyaminosilicone/polyaminosilicone block copolymer/surfactant composition was added in addition to the Adhesive A or B. In FIG. 1, a 4% addition of the composition indicates the Adhesive A or adhesive B, and the composition consists of 2.00% adhesive and release agents, Adhesive A or Adhesive B, and 0.08% of the polyaminosilicone/polyaminosilicone block copolymer/surfactant composition. The apparatus has an instrumented crepe blade that allows the measurement and recording of the force used to separate the sheet from the Yankee cylinder; this is referred to as the Creping Force. As mentioned previously the process of separating the sheet from the Yankee cylinder is a fracture process. The crepe structure of the resulting sheet is dependent on how much energy is used to separate the sheet from the Yankee dryer, i.e., crepe the sheet, and how that energy is dissipated. FIG. 1, shows that as the content of the polyaminosilicone/polyaminosilicone block copolymer/surfactant composition is increased the crepe force is reduced. This indicates that the composition has altered the fracture process that occurs when the sheet is separated from the Yankee.

FIGS. 2 and 3, are graphs showing data obtained using the Emtec Tissue Softness Analyzer (TSA). This a commercially available device that is used in the tissue and towel industry to evaluate the softness of tissue and towel products. It was originally developed in 2004 and since that time has gained considerable acceptance in the industry. The device makes three measurements on a restrained sheet of tissue or towel. One measurement is a deflection measurement and is referred to as "D". In the case of "D", a higher measurement, a greater deflection, indicates a softer sheet. The other two measurements are acoustic measurements. A paddle wheel type of device is pressed against the surface of the restrained sheet and is rotated at a high speed. The vibration of the sheet produces sound the magnitude of which is measured across a frequency range of 0 to 20,000 Hz. Tissue and towel have characteristic vibration peaks at 750 Hz and just below 7,000 Hz. The peak at 750 Hz is referred to as 'TS 750' and is associated with embossing type surface structures. The peak at just below 7,000 Hz is referred as 'TS 7' and is associated with fiber and crepe structure scale variations in the sheet surface. In the case of both the TS 750 and the TS 7 values, a lower value indicates less vibration and a softer sheet. All three measurements are used in a proprietary algorithm to calculate a handfeel value. A higher handfeel value indicates a softer sheet. The maximum handfeel value is 100. In FIG. 2, the TS 7 measurements are shown for Adhesives A and B at a 2% addition level for the composition. It is seen that for both formulations there was a reduction in TS 7, although the reduction was not the same for both formulations. This is an indication that the composition can be adjusted depending on the materials being applied to the Yankee. In FIG. 3, the calculated handfeel measurements are given. Results indicated that the use of the present composition resulted in a softer sheet.

In exemplary embodiments, aspects of the disclosure include, but are not limited to:

1. A composition for enhancing the creping of a fibrous web comprising a polyaminosilicone or a polysiloxane, a polyaminosilicone block copolymer, a surfactant, and optionally one or more creping aids; wherein the composition is applied directly onto a Yankee dryer and/or a fibrous web prior to the Yankee dryer.

2. The composition according to aspect 1, wherein the polyaminosilicone block co-polymer is a non-hydrolyzable, block, (AB) or $(AB)_nA$ type copolymer comprising alternating units of polysiloxanes and amino-polyalkylene oxides.

3. The composition according to aspect 2, wherein the alternating units of polysiloxanes and amino-polyalkylene oxides have the formula $[X(C_aH_{2a}O)bR2[SiO(R1)2]cSi(R1)2R2(OC_aH_{2a})bX]$ and $[YO(C_aH_{2a}O)dY]$, wherein R1 is a C1 to C4 alkyl, R2 is a divalent organic moiety, X and Y are divalent organic groups selected from a secondary or tertiary amine and a ring opened epoxide, such that when X is a ring opened epoxide, Y is an amine and vice versa, a is 2 to 4 or 2 to 3, each occurrence of b is 0 to 100, d is 0 to 100, (b+d) is 1 to 100, or 10 to 50, and c is 1 to 500 or 10 to 100.

4. The composition according to aspect 1, wherein the surfactant is an alkoxylated alcohol selected from the group of linear alcohol ethoxylated, branched alcohol ethoxylated, polyethylene glycol mono or diester fatty acid, polyethylene glycol alkyl ether and combinations thereof.

5. The composition according to aspect 1, wherein the optionally one or more creping aids is selected from the group of additional surfactants, adhesives, release agents, modifier agents, plasticizers and combinations thereof.

6. The composition according to aspect 5, wherein the additional surfactants are selected from the group of hydrophobic materials, nonionic surfactants, anionic surfactants, and mixtures of thereof.

7. The composition according to aspect 6, wherein the hydrophobic materials are selected from the group of mineral oil, vegetable oil, fatty acid esters, natural or synthetically derived hydrocarbon, natural or synthetically derived wax, Carnauba wax, hydrolyzed AKD, polyethylene homopolymers, polypropylene homopolymers, ethylene-acrylic acid copolymers, ethylene maleic anhydride copolymers, propylene maleic anhydride copolymers, polyethylene homopolymers, oxidized polypropylene homopolymers, and oxidized polyethylene homopolymers.

8. The composition according to aspect 6, wherein the nonionic surfactant selected from the group selected from linear alcohol alkoxylated, branched alcohol ethoxylated, polyethylene glycol mono or diester fatty acid, polyethylene glycol alkyl ether and combinations thereof.

9. The composition according to aspect 6, wherein the anionic surfactant is selected from the group of sodium dioctylsulfosuccinate, sodium dodecylbenzenesulfonate, sodium lauryl sulfate and combinations thereof.

10. The composition according to aspect 5, wherein the adhesive is selected from the group of a thermosetting resin, a non-thermosetting resin, a polyamide resin, a polyaminoamide resin, polyvinylamine, a glyoxalated polyacrylamide resin, a film-forming semi-crystalline polymer, hemicellulose, carboxymethyl cellulose, polyvinyl alcohol, an inorganic cross-linking agent and combinations thereof.

11. A method for enhancing the creping of a fibrous web comprising: applying a composition comprising a polyaminosilicone, a polyaminosilicone block copolymer, and a surfactant or a polysiloxane, a polyaminosilicone block copolymer, and a surfactant; and optionally one or more creping aids, directly onto a surface of a Yankee dryer and/or to a wet fibrous web prior to the Yankee dryer.

12. The method according to aspect 11, wherein the polyaminosilicone block copolymer is a non-hydrolyzable, block, (AB) or (AB)nA type copolymer comprising alternating units of polysiloxane and amino-polyalkylene oxide.

13. The method according to aspect 12, wherein the alternating units of polysiloxane and polyalkyleneoxides have the formula [X(CaH2aO)bR2[SiO(R1)2]cSi(R1)2R2 (OCaH2a)bX] and [YO(CaH2aO)dY], wherein R1 is a C1 to C4 alkyl, R2 is a divalent organic moiety, X and Y are divalent organic groups selected from a secondary or tertiary amine and a ring opened epoxide, such that when X is a ring opened epoxide, Y is an amine and vice versa, a is 2 to 4 or 2 to 3, each occurrence of b is 0 to 100, d is 0 to 100, (b+d) is 1 to 100 or 10 to 50, and c is 1 to 500 or 10 to 100.

14. The method according to aspect 11, wherein the surfactant is an alkoxylated alcohol selected from the group of linear alcohol ethoxylated, branched alcohol ethoxylated, polyethylene glycol mono or diester fatty acid, polyethylene glycol alkyl ether and combinations thereof.

15. The method according to aspect 14, wherein the surfactant is tridecyl alcohol alkoxylate.

16. The method according to aspect 11, wherein the one or more optional creping aids is selected from the group of additional surfactants, adhesives, release agents, modifier agents, plasticizers and combinations thereof.

17. The method according to aspect 16, wherein the one or more creping aids comprises an adhesive selected from the group of a thermosetting resin, a non-thermosetting resin, a polyamide resin, a polyaminoamide resin, polyvinylamine, a glyoxalated polyacrylamide resin, a film-forming semi-crystalline polymer, hemicellulose, carboxymethyl cellulose, polyvinyl alcohol, an inorganic cross-linking agent and combinations thereof.

18. The method according to aspect 11, wherein the composition comprising polyaminosilicone, silicone block copolymer, surfactant and optionally one or more creping aids, are mixed together before being applied to the surface of the Yankee dryer and/or to the wet fibrous web prior to the Yankee drier.

19. The method according to aspect 11, wherein the composition comprising polyaminosilicone, silicone block copolymer, surfactant, and optionally one or more creping aids, is first applied to the wet fibrous web, and wherein the composition is transferred to the surface of the Yankee dryer on pressing the wet fibrous web against the surface of the Yankee dryer.

20. A paper made according to the method of aspect 11.

While embodiments of the disclosure have been illustrated by a description of various examples, and while these embodiments have been described in considerable detail, it is not the intention of the applicant to restrict or in any way limit the scope of the appended claims to such detail. Additional advantages and modifications will readily appear to those skilled in the art. The disclosure in its broader aspects is therefore not limited to the specific details, representative methods, and illustrative examples shown and described. Accordingly, departures may be made from such details without departing from the spirit or scope of applicant's general inventive concept.

What is claimed is:

1. A method for enhancing the creping of a fibrous web comprising: applying a composition comprising a polyaminosilicone, a polyaminosilicone block copolymer, and a surfactant; or a polysiloxane, a polyaminosilicone block copolymer, and a surfactant; and optionally one or more creping aids, directly onto a surface of a Yankee dryer and/or to a wet fibrous web prior to the Yankee dryer.

2. The method according to claim 1, wherein the polyaminosilicone block copolymer is a non-hydrolyzable, block, (AB) or $(AB)_n$A type copolymer comprising alternating units of polysiloxane and amino-polyalkylene oxide.

3. The method according to claim 2, wherein polyaminosilicone block copolymer is the $(AB)_n$A type copolymer and wherein the alternating units of polysiloxane and polyalkyleneoxides have the formula $[X(C_aH_{2a}O)_bR^2[SiO(R^1)_2]_cSi(R^1)_2R^2(OC_aH_{2a})_bX]$ and $[YO(C_aH_{2a}O)_dY]$, $R^1$ is a $C_1$ to $C_4$ alkyl, $R^2$ is a divalent organic moiety, X and Y are divalent organic groups selected from a secondary or tertiary amine and a ring opened epoxide, such that when X is a ring opened epoxide, Y is an amine and vice versa, a is 2 to 4, or 2 to 3, each occurrence of b is 0 to 100, d is 0 to 100, (b+d) is 1 to 100 or 10 to 50, and c is 1 to 500 or 10 to 100.

4. The method according to claim 1, wherein the surfactant is an alkoxylated alcohol selected from the group of linear alcohol ethoxylated, branched alcohol ethoxylated, polyethylene glycol mono or diester fatty acid, polyethylene glycol alkyl ether or combinations thereof.

5. The method according to claim 4, wherein the surfactant is tridecyl alcohol alkoxylate.

6. The method according to claim 1, wherein the one or more optional creping aids is present and is selected from the group of additional surfactants, adhesives, release agents, modifier agents, plasticizers or combinations thereof.

7. The method according to claim 6, wherein the one or more creping aids comprises an adhesive selected from the group of a thermosetting resin, a non-thermosetting resin, a polyamide resin, a polyaminoamide resin, polyvinylamine, a glyoxalated polyacrylamide resin, a film-forming semi-crystalline polymer, hemicellulose, carboxymethyl cellulose, polyvinyl alcohol, an inorganic cross-linking agent or combinations thereof.

8. The method according to claim 1, wherein the composition comprises polyaminosilicone, silicone block copolymer, surfactant and optionally one or more creping aids, and wherein the polyaminosilicone, silicone block copolymer, surfactant and optionally one or more creping aids are mixed together before being applied to the surface of the Yankee dryer and/or to the wet fibrous web prior to the Yankee drier.

9. The method according to claim 1, wherein the composition comprises polyaminosilicone, silicone block copolymer, surfactant, and optionally one or more creping aids, wherein the composition is first applied to the wet fibrous web, and wherein the composition is transferred to the surface of the Yankee dryer upon pressing the wet fibrous web against the surface of the Yankee dryer.

* * * * *